Feb. 27, 1962 H. R. KARLEN 3,022,894
LIQUID FILTER
Filed June 8, 1959 2 Sheets-Sheet 1
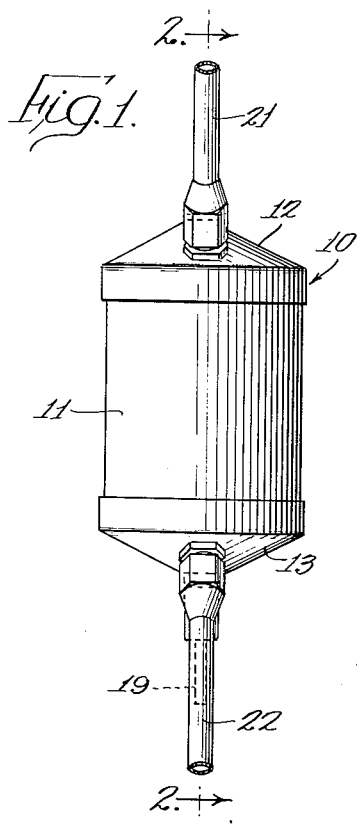
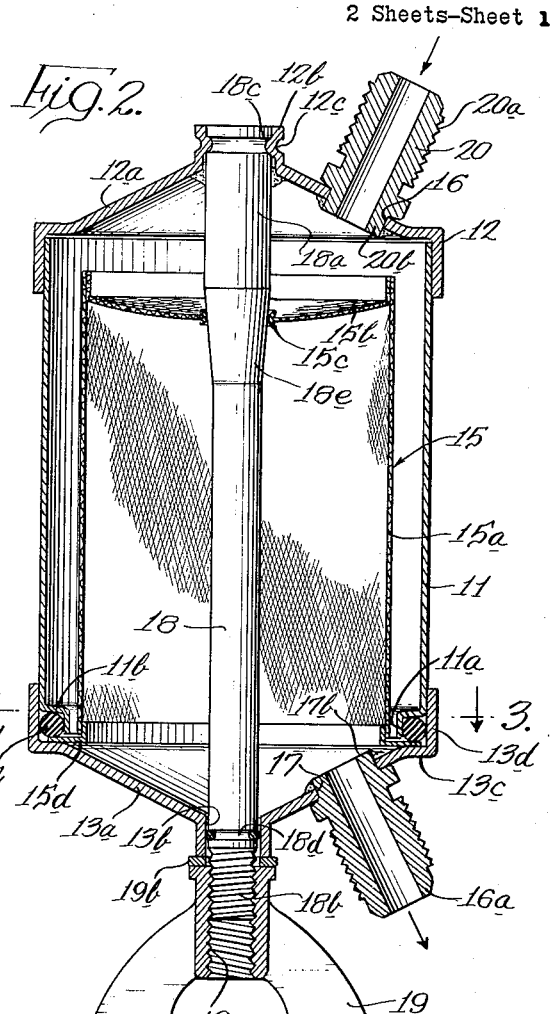
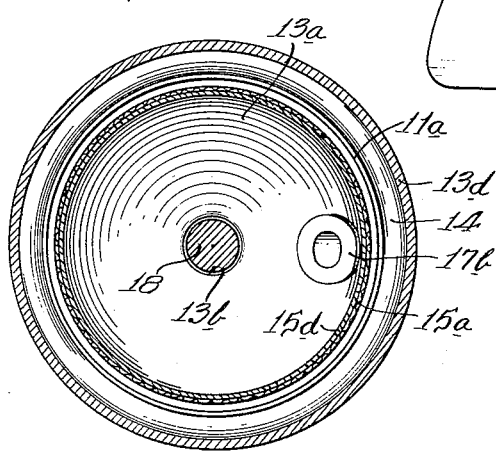
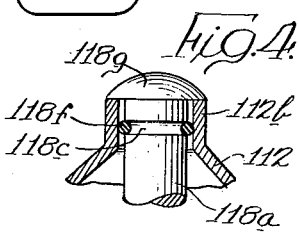
INVENTOR.
Harvey R. Karlen

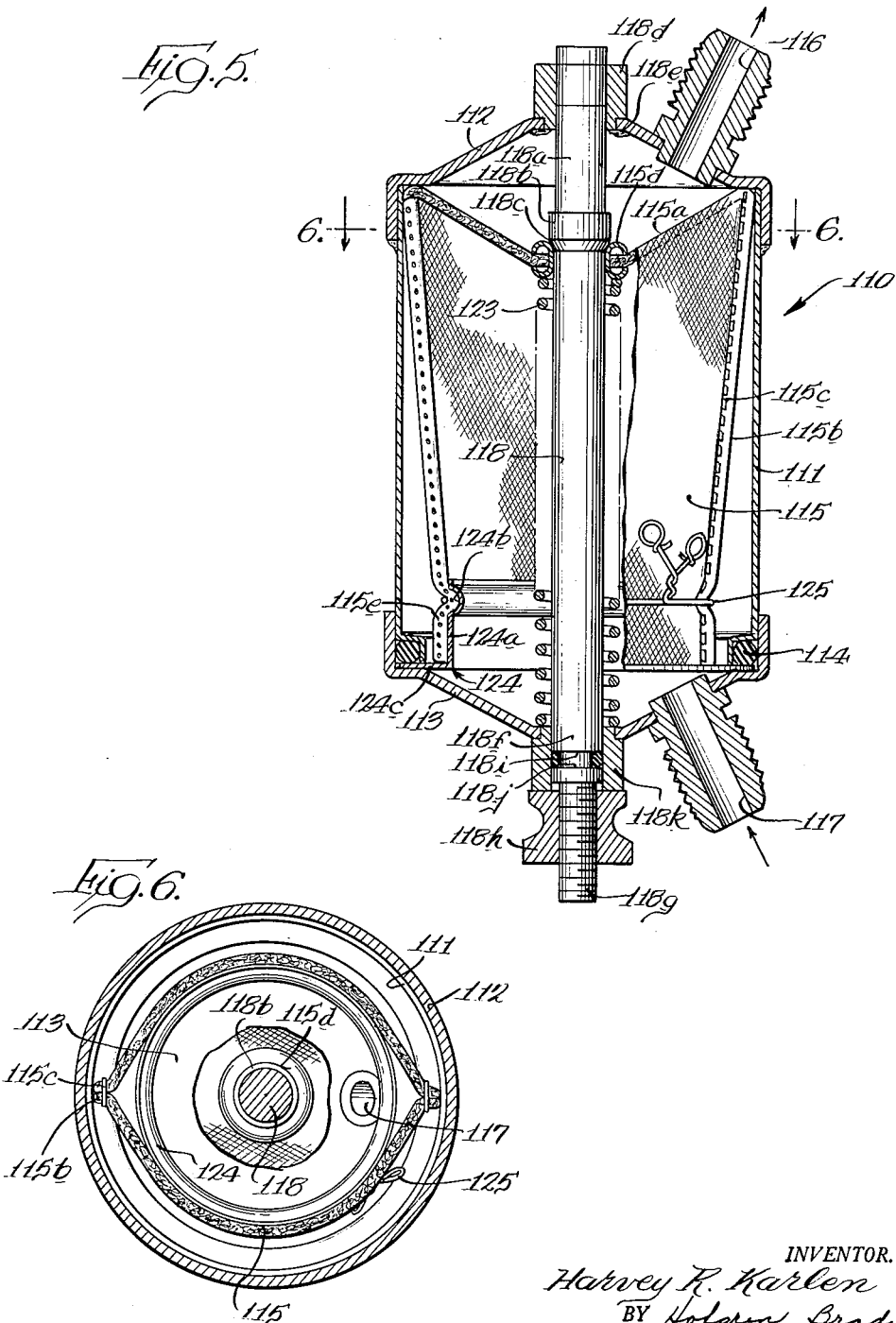

United States Patent Office 3,022,894
Patented Feb. 27, 1962

3,022,894
LIQUID FILTER
Harvey R. Karlen, Chicago, Ill., assignor to Cory Corporation, a corporation of Delaware
Filed June 8, 1959, Ser. No. 818,974
6 Claims. (Cl. 210—452)

This invention relates to a liquid filter and particularly to a water filter arranged to be assembled and disassembled readily.

This application comprises a continuation-in-part of my copending application Serial No. 572,660 filed March 20, 1956 now abandoned.

In many commercial installations, such as in water heaters used in beverage producing apparatus, it is desirable to provide a filter in the inlet line to assure the provision of clear water. It is desired that such filters be readily maintainable, and to this end it is preferable that assembly and disassembly thereof be simple.

The principal object of this invention is to provide a new and improved liquid filter which may be assembled and disassembled readily and without the use of tools.

Another object of this invention is to provide a liquid filter having manually operable securing means and means for permanently connecting an inlet line and an outlet line to the filter while allowing ready assembly and disassembly of the filter.

A further object is to provide a filter having a hollow body, a readily removable filter element in the body, and means for laterally positioning the filter element in the body, which means may accommodate a variation in the length of the filter element relative to the body.

Still another object is to provide a liquid filter having a hollow body with an open end, a filter element in the body and extending laterally outwardly at the open end, a cover disposed longitudinally outwardly of the open end, and sealing means adapted to be urged by the cover acting through the filter means sealingly to connect the filter means, the body, and the cover.

A yet further object of the invention is to provide a liquid filter having a tubular body and outwardly dished elements at the ends for permanent connection of an inlet and an outlet tube in fluid conductive relationship with the filter.

A still further object of the invention is to provide a liquid filter having a novel filter bag and a co-operating retaining ring and mounting post structure for disposing the bag in filtering disposition in the filter.

A yet further object is to provide such a liquid filter including novel biasing means for retaining the filter bag in the filtering disposition.

Other features and advantages of this invention will be apparent from the following description taken in connection with the accompanying drawings wherein:

FIG. 1 is an elevational view of a liquid filter embodying the invention and with end portions of an inlet tube and an outlet tube connected thereto;

FIG. 2 is an enlarged sectional view taken approximately along the line 2—2 of FIG. 1;

FIG. 3 is a sectional view taken approximately along the line 3—3 of FIG. 2;

FIG. 4 is a fragmentary sectional view of a modified form of post retaining means;

FIG. 5 is a longitudinal diametric sectional view of another form of the invention; and FIG. 6 is a transverse section taken approximately along the line 6—6 of FIG. 5.

In the preferred exemplary embodiment of the invention as disclosed in FIGS. 1–3 of the drawings, a liquid filter, generally designated 10, is seen to comprise a generally tubular body 11 closed at one end by an end member 12 and at the opposite end by a removable cover 13 which is sealed to body 11 by sealing means 14. Received in body 11 and extending completely transversely thereacross is a filter element 15 adapted to filter water passed through liquid filter 10 from an inlet opening 16 in end member 12 to an outlet opening 17 in cover 13. Inlet 16 is arranged to have a tube end 21 permanently secured in fluid conductive relationship therewith, and outlet 17 is arranged to have a tube end 22 permanently secured in fluid conductive relationship therewith.

Means for securing cover 13 to body 11 are provided in the form of a retaining member or post 18 secured at one end 18a to end member 12 and extending longitudinally through body 11 and cover 13. At the other end 18a which extends outwardly from cover 13, post 18 is arranged to receive a suitable manually operable fastening element 19. This retaining structure allows the ready movability of cover 13 from body 11 with the tube end 22 permanently connected to outlet 17, thus simplifying maintenance of filter element 15.

Particular reference now being had to FIG. 2, the specific construction of the preferred embodiment of my invention may be seen. End member 12, which is arranged to close the inlet end of body 11, is fixedly secured thereacross by suitable means such as soldering and is provided with an outwardly dished mid-portion 12a having the opening 16 and a central well 12b. Well 12b is adapted to receive diametrically enlarged inner end 18a of post 18, and is spun radially inwardly to provide an annular boss 12c which is received in a complementary groove 18c provided in post end 18a to retain the post in the well. If desired, means such as soldering may be employed to augment the boss and groove retention.

The open end 11a of tubular body 11 is provided with a notch 11b which opens longitudinally and radially outwardly to receive sealing means 14 comprising a rubber O-ring. Cover 13 is provided with an outwardly dished mid-portion 13a having the opening 17, and a central cylindrical extension 13b through which outer end 18b of post 18 passes. Suitable means for sealing post 18 to cover 13 may be provided in the form of an O-ring 18d concentrically carried on post outer end 18b to lie within cylindrical extension 13b when the cover is in the closed position. It should be noted that the longitudinal extension of the cylindrical posts 13b allows proper sealing of the O-ring 18d therewith notwithstanding a variation in the longitudinal position of the O-ring. Thus, manufacturing tolerances as to the length of the post 18 or the position of the O-ring on the post may be readily accommodated. The portion of post end 18b extending longitudinally outwardly from O-ring 18d is threaded to receive an internally threaded portion 19a of fastening element 19 illustratively shown as a wing nut. To reduce sliding friction between wing nut 19 and cover 13 when the nut is manually advanced on post 18, a suitable washer 19b is interposed therebetween.

Cover 13 is further provided with a radially extending margin 13c arranged to lie longitudinally outwardly of notch 11b, and a peripheral annular flange 13d arranged to lie radially outwardly of notch 11b and to extend from a point longitudinally outwardly of the notch (i.e., away from end member 12) to a point longitudinally inwardly of the notch (i.e., toward end member 12). Thus flange 13d overlies the notch and in co-operation with margin 13c retains O-ring 14 therein. The internal diameter of flange 13d is preferably comparable to the external diameter of the body 11 so that the sliding engagement therebetween acts to guide the cover into centered relationship with body end 11a.

Filter element 15 comprises a foraminous cylindrical portion 15a and a foraminous transversely inwardly extending inner end 15b. An annular gasket 15c is provided centrally of end 15b to be carried concentrically and sealingly on post 18. To assure a tight fit of gasket 15c on post 18, a frusto-conical portion 18e is provided in the post, narrowing toward end 18b. Further, filter end 15b is somewhat flexible and thus allows proper engagement of gasket 15c on the post notwithstanding a variation in the length of the filter elements as manufactured. The external diameter of cylindrical portion 15a is made somewhat less than the internal diameter of body 11, so that water may pass through member 15 over its entire longitudinal extent. The outer end of filter element 15 is provided with a radially outwardly extending support ring 15d which is adapted to lie longitudinally outwardly of notch 11b and between cover margin 13c and O-ring 14. Thus, this portion of filter element 15 effects a transverse extension of the filter element completely across body 11.

Means are provided for connecting the tubes to inlet 16 and outlet 17 comprising tube fittings 20 of well-known construction. Each fitting is provided with an externally threaded outer portion 20a and a cylindrical inner portion 20b. Inner end 20b is arranged to pass through the opening (i.e. inlet opening 16 or outlet opening 17) and is secured in place by means such as soldering. As the inlet and outlet openings are located in the dished portions of end member 12 and cover 13 respectively, the inner portions 20b of the fittings terminate longitudinally outwardly of body 11 allowing the entire interior thereof to be available for receiving filter element 15. As is obvious, alternatively the flow through liquid filter 10 may be reversed, that is opening 16 may comprise the outlet opening and opening 17 may comprise the inlet opening by reversing the tube connections thereto.

The installation and use of my liquid filter is extremely simple. In the illustrated arrangement of the fitting, tube end 21 is connected permanently to the fitting 20 at inlet 16, and tube end 22 is secured permanently to the fitting at outlet 17. Water to be filtered is then passed through the filter entering at inlet 16 and leaving at outlet 17. In passing through the filter, all the water must pass through the foraminous filter element 15 which screens out undesirable material. The relatively large area of element 15 allows relatively unimpaired flow therethrough.

Should it be desirable to disassemble filter 10 for any reason such as cleaning the interior thereof, or the replacement of filter element 15, this may be done without disconnecting tubes 21 and 22 from their fittings 20. Thus, wing nut 19 is unthreaded from post 18 and washer 19b removed. Cover 13 is then moved longitudinally outwardly from body end 11a until cover flange 13d lies in a plane longitudinally outwardly of the post. Normally the yieldable nature of the tubing material comprising tubes 21 and 22 allows this limited movement of the portion thereof connected to the filter members. Cover 12 and body 11 are moved relatively laterally until the cover clears open end 11a and complete and free access may be had to the interior of the filter. As support ring 15d of filter element 15 is no longer retained against O-ring 14, the filter element may be withdrawn simply by moving it over the post.

To reassemble the filter, the filter element is inserted over the post until ring 15d abuts O-ring 14. Should a filter element different from the one withdrawn be inserted, any difference in the length of the filter elements is accommodated by the springy nature of the end 15b allowing gasket 15c to fit properly on post portion 18e. Cover 13 is then moved laterally back into axial alignment with the post and then moved axially until post end 18b projects through cylindrical portion 13b. Gasket 19b is then placed on the post and wing nut 19 is used to secure the assembly.

In FIGURE 4 is shown a modified form of means for securing the post to the end member. A modified end member 112 is provided having a straight-walled, cylindrical well 112b. An O-ring 118f is carried in a groove 118c provided in post inner end 118a and seals the post to end member 112. Post end 118a is provided at its inner extremity with a radially enlarged head 118g which bears against the inner end of well 112b when the filter is assembled. In all other respects, the structure of the filter of FIGURE 4 is similar to that of FIGURES 1 to 3.

The filter utilizing the post retaining means of FIGURE 4 is particularly adapted for use where substantially no play in tubes 21 and 22 is allowed. Thus, in this form of the invention, when it is desired to remove cover 13, once wing nut 19 is removed from the post by unthreading it therefrom, the post is free to move longitudinally inwardly until the outer end 18b is fully received within body 11. Cover 13 need then only be moved longitudinally the length of its flange 13d and then laterally to clear open end 11a of body 11.

In reassembling the filter, cover 13 is merely repositioned over body open end 11a and the post moved longitudinally until the outer end, 18b, projects through the cover cylindrical portion 13b and post head 118g abuts well 112b. Gasket 19b and wing nut 19 are then moved over the post end and the wing nut is drawn up to tighten the filter in assembled relationship.

Referring now to FIGS. 5 and 6, a modified form of liquid filter, generally designated 110, is seen to comprise a generally tubular body 111 closed at one end by an end member 112 and at the opposite end by a cover 113 removably sealed to body 111 by an annular sealing means, herein O-ring 114. Flow passages are provided through end member 112 and cover 113, the flow passage through end member 112 illustratively comprising an outlet opening 116 and the flow passage in cover 113 illustratively comprising an inlet opening 117.

The above described elements of liquid filter 110 are generally similar to the corresponding elements of liquid filter 10. The filter element 115 and post structure 118 of liquid filter 110, however, comprise modifications of the corresponding filter element 15 and post structure 18 of liquid filter 10 and are discussed more fully hereinafter. More specifically, filter element 115 comprises a bag formed of a suitable filter material such as felt. The bag may be formed of a single sheet of felt material folded back onto itself at end 115a and secured along its longitudinal edges 115b by means such as stitching 115c. An annular gasket 115d in the form of a brass grommet is provided centrally of end 115a and is carried concentrically and sealingly on post 118. Adjacent the end 118a of post 118 which extend through end member 112 is an annular boss 118b having a frusto-conical surface 118c narrowing toward cover member 113 and against which grommet 115d is sealingly urged by a coil spring 123 concentrically surrounding post 118. The open end 115e of filter element 115 is secured to an annular support 124 held between cover member 113 and the apposed end of body member 111. More specifically, annular support member 124 includes a cylindrical portion 124a extending concentrically of the axis of post 118 and having an annular groove 118b. A wire tie 125 is tied around filter bag end 115e to urge the same forcibly into groove 118b and thereby secure the bag end to annular support 124. The annular support further includes a radial flange portion 124c clamped between cover member 113 and the apposed end of body 111 to complete the transverse extension of the filter element completely across body 111.

End member 112 is sealingly secured to one end of body 111 as by soldering. An annular collar 118d fixed to end 118a of post 118 is sealingly secured to end member 112 by suitable means such as solder 118e. The opposite end 118f of the post projects through cover member 113 and is provided with an exteriorly threaded, reduced diameter outer portion 118g on which is threaded a knurled nut 118h. Inwardly of threaded portion 118g, post end 118f is provided with an annular groove 118i in which is received an O-ring 118j for sealing the post to an annular collar 118k sealingly engaging cover member 113.

The operation of liquid filter 110 is as follows. Water to be filtered is passed through inlet opening 117 to within filter element 115, through the filter element, and outwardly from the liquid filter through outlet opening 116. Disassembly and reassembly of the liquid filter 110 is generally similar to that of liquid filter 10. To replace the filter element 115 when desired, the previously installed filter element is withdrawn over outer end 118f of the post subsequent to a disassociation of cover member 113 and spring 123 therefrom. The replacement filter element is then installed over post 118 with grommet 115d thereof juxtaposed to boss surface 118c and spring 123 is reinstalled to extend between cover member 113 and the grommet and urge the grommet sealingly against the surface 118c. Upon resecuring of the assembly of liquid filter 110 by the tightening of knurled nut 118h, the liquid filter is again available for filtering operation.

While I have shown and described certain embodiments of my invention, it is to be understood that it is capable of many modifications. Changes, therefore, in the construction and arrangement may be made without departing from the spirit and scope of the invention as defined in the appended claims.

I claim:

1. A liquid filter comprising: an enclosure having an open portion and an inlet spaced from the open portion; a post in the enclosure secured thereto to extend axially through the enclosure and outwardly through the open portion; a cup-shaped filter element in the enclosure and having an outer end opening outwardly through said open portion, said filter element further having a generally cylindrical portion and a flexible outwardly dished, inner end portion concentrically around the post; means biasing said dished inner end portion inwardly to engage it sealingly with the post; an annular support in secured relationship with the filter element opposite said end portion and having an outturned flange juxtaposed outwardly to the edge of said open portion; and means co-operating with said post to clamp said flange sealingly to the edge of said open portion and fix said outer end of the filter element concentrically of the post whereby the cylindrical portion of the filter element is retained concentrically of the post.

2. The liquid filter of claim 1 wherein the post is provided with a frusto-conical portion widening away from said enclosure open portion, and said dished end portion is provided with an annular sealing member wedged against said frusto-conical portion by the action of said biasing means.

3. A liquid filter comprising: an enclosure having an open portion and an inlet spaced from the open portion; a post in the enclosure secured thereto to extend outwardly through the open portion; a cup-shaped filter element in the enclosure and having an outer end opening outwardly through said open portion, said filter element being formed of a filter cloth and further having a generally cylindrical portion and an end portion concentrically around the post; an annular support in secured relationship with the filter element opposite said end portion and having an outturned flange juxtaposed outwardly to the edge of said open portion of the enclosure; means co-operating with said post to clamp said flange sealingly to the edge of said open portion to retain the cylindrical portion of the filter element concentrically of the post; and means biasing said end portion of the filter element inwardly into sealing engagement with the post.

4. A liquid filter comprising: an enclosure having an open portion and an inlet spaced from the open portion; a post in the enclosure secured thereto to extend outwardly through the open portion; a cup-shaped filter element in the enclosure and having an outer end opening outwardly through said open portion, said filter element further having a generally cylindrical portion and an end portion concentrically around the post; an annular support in secured relationship with the filter element opposite said end portion and having an outturned flange juxtaposed outwardly to the edge of said open portion of the enclosure; means co-operating with said post to clamp said flange sealingly to the edge of said open portion to retain the cylindrical portion of the filter element concentrically of the post; and means biasing said end portion of the filter element inwardly into sealing engagement with the post, said filter element comprising a sheet of filter cloth having its longitudinal edges secured to each other to form the generally cylindrical portion.

5. A liquid filter comprising: an enclosure having an open portion and an inlet spaced from the open portion; a post in the enclosure secured thereto to extend outwardly through the open portion; a cup-shaped filter element in the enclosure and having an outer end opening outwardly through said open portion, said filter element further having a generally cylindrical portion and an end portion concentrically around the post; an annular support in secured relationship with the filter element opposite said end portion and having an outturned flange juxtaposed outwardly to the edge of said open portion of the enclosure; means co-operating with said post to clamp said flange sealingly to the edge of said open portion to retain the cylindrical portion of the filter element concentrically of the post; and means biasing said end portion of the filter element inwardly into sealing engagement with the post, said filter element comprising a sheet of filter cloth having a folded portion defining said end portion.

6. A liquid filter comprising: an enclosure having an open portion and an inlet spaced from the open portion; a post in the enclosure secured thereto to extend outwardly through the open portion; a cup-shaped filter element in the enclosure and having an outer end opening outwardly through said open portion, said filter element being formed of a filter cloth and further having a generally cylindrical portion and an end portion concentrically around the post; an annular support in secured relationship with the filter element opposite said end portion and having an outturned flange juxtaposed outwardly to the edge of said open portion of the enclosure; means co-operating with said post to clamp said flange sealingly to the edge of said open portion to retain the cylindrical portion of the filter element concentrically of the post; and means biasing said end portion of the filter element inwardly into sealing engagement with the post, said annular support being provided with an annular, outwardly opening groove and a tie urging said filter element into said groove to secure the filter element to said support.

References Cited in the file of this patent
UNITED STATES PATENTS

| | | |
|---|---|---|
| 1,061,755 | Kneuper | May 13, 1913 |
| 2,468,328 | Hill | Apr. 26, 1949 |
| 2,576,144 | Rood | Nov. 27, 1951 |
| 2,597,217 | Zenick | May 20, 1952 |
| 2,772,001 | Bowers | Nov. 27, 1956 |